United States Patent
Kelly et al.

(10) Patent No.: US 11,136,238 B2
(45) Date of Patent: Oct. 5, 2021

(54) OTM SYNGAS PANEL WITH GAS HEATED REFORMER

(71) Applicant: PRAXAIR TECHNOLOGY, INC., Danbury, CT (US)

(72) Inventors: Sean M. Kelly, Pittsford, NY (US); Ines C. Stuckert, Grand Island, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 17/055,194

(22) PCT Filed: May 15, 2019

(86) PCT No.: PCT/US2019/032416
§ 371 (c)(1),
(2) Date: Nov. 13, 2020

(87) PCT Pub. No.: WO2019/226435
PCT Pub. Date: Nov. 28, 2019

(65) Prior Publication Data
US 2021/0221681 A1    Jul. 22, 2021

Related U.S. Application Data

(60) Provisional application No. 62/674,129, filed on May 21, 2018.

(51) Int. Cl.
*C01B 13/02* (2006.01)
*C01B 3/38* (2006.01)
(Continued)

(52) U.S. Cl.
CPC ....... *C01B 13/0255* (2013.01); *B01J 19/2475* (2013.01); *C01B 3/382* (2013.01);
(Continued)

(58) Field of Classification Search
CPC ..... C01B 13/0255; C01B 3/382; C01B 3/384; C01B 2203/0233; C01B 2203/0244;
(Continued)

(56) References Cited

U.S. PATENT DOCUMENTS

| 2,593,507 A | 4/1952 | Wainer |
| 2,692,760 A | 10/1954 | Flurschutz |

(Continued)

FOREIGN PATENT DOCUMENTS

| DE | 10330859 A1 | 2/2004 |
| DE | 102004038435 A1 | 2/2006 |

(Continued)

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

(Continued)

*Primary Examiner* — Jafar F Parsa
(74) *Attorney, Agent, or Firm* — Ralph J. Mancini

(57) ABSTRACT

The present invention generally relates to an oxygen transport membrane syngas panel whereby the reformer layer of the panel is eliminated, and the primary reforming function is integrated into the manifold as a gas heated reformer with product syngas as the source of heat.

16 Claims, 10 Drawing Sheets

(51) Int. Cl.
*B01J 19/24* (2006.01)
*B01J 23/46* (2006.01)
*B01J 23/755* (2006.01)

(52) U.S. Cl.
CPC ............. *C01B 3/384* (2013.01); *B01J 23/464* (2013.01); *B01J 23/755* (2013.01); *B01J 2219/00121* (2013.01); *B01J 2219/00157* (2013.01); *B01J 2219/24* (2013.01); *C01B 2203/0233* (2013.01); *C01B 2203/0244* (2013.01)

(58) Field of Classification Search
CPC ............... C01B 13/0251; B01J 19/2475; B01J 2219/00157; B01J 2219/00121; B01J 2219/24; B01D 53/228
See application file for complete search history.

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Boquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Abbott |
| 6,268,075 B1 | 7/2001 | Autenrieth et al. |
| 6,290,757 B1 | 9/2001 | Lawless |
| 6,293,084 B1 | 9/2001 | Dmevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Dmevich et al. |
| 6,368,383 B1 | 4/2002 | Virkar et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,279,244 B2 | 10/2007 | Morishima et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |

(56) References Cited

U.S. PATENT DOCUMENTS

| | | |
|---|---|---|
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,704,070 B2 | 4/2010 | Veenstra |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,722,010 B1 | 5/2014 | Grover |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,422 B2 | 6/2016 | Chakravarti et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 9,556,027 B2 | 1/2017 | Chakravarti et al. |
| 9,611,144 B2 | 4/2017 | Chakravarti et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0070509 A1 | 3/2011 | Mai |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0209618 A1 | 9/2011 | Takahashi |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1 | 3/2012 | Sane et al. |
| 2012/0194783 A1 | 11/2012 | Palamara et al. |
| 2012/0288439 A1 | 11/2012 | Sundaram et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0156978 A1 | 6/2013 | Christie et al. |
| 2013/0258000 A1 | 10/2013 | Ohashi et al. |

(56) References Cited

U.S. PATENT DOCUMENTS

| | | |
|---|---|---|
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0231351 A1 | 8/2014 | Wickramasinghe et al. |
| 2014/0319424 A1 | 10/2014 | Chakravarti et al. |
| 2014/0319425 A1 | 10/2014 | Chakravarti et al. |
| 2014/0319426 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0096506 A1 | 4/2015 | Kelly et al. |
| 2015/0098872 A1 | 4/2015 | Kelly et al. |
| 2015/0132485 A1 | 5/2015 | Garing et al. |
| 2015/0226118 A1 | 8/2015 | Kelly et al. |
| 2015/0328582 A1 | 11/2015 | Joo et al. |
| 2016/0001221 A1 | 1/2016 | Lu et al. |
| 2016/0118188 A1 | 4/2016 | Wada |
| 2016/0155570 A1 | 6/2016 | Shimada et al. |

FOREIGN PATENT DOCUMENTS

| | | |
|---|---|---|
| EP | 0 663 231 A2 | 7/1995 |
| EP | 0926096 A1 | 6/1999 |
| EP | 0984500 A2 | 3/2000 |
| EP | 0989093 A2 | 3/2000 |
| EP | 1 459 800 A2 | 9/2004 |
| EP | 1504811 A1 | 2/2005 |
| EP | 1717420 A1 | 11/2006 |
| EP | 1743694 A1 | 1/2007 |
| EP | 1930076 A1 | 6/2008 |
| EP | 2098491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| GB | 2016298 A | 9/1979 |
| JP | 56-136605 | 10/1981 |
| JP | 2001-520931 | 11/2001 |
| JP | 2003-534906 | 11/2003 |
| WO | WO 97/41060 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007/021911 A2 | 2/2007 |
| WO | WO 2007/060141 | 5/2007 |
| WO | WO 2007/086949 | 8/2007 |
| WO | WO 2007/092844 A2 | 8/2007 |
| WO | WO 2008/024405 | 2/2008 |
| WO | WO 2009/027099 A1 | 3/2009 |
| WO | WO 2010/052641 A2 | 5/2010 |
| WO | WO 2011/020192 A1 | 2/2011 |
| WO | WO 2011/083333 A1 | 7/2011 |
| WO | WO 2011/121095 A2 | 10/2011 |
| WO | WO 2012/067505 A2 | 5/2012 |
| WO | WO 2012/118730 | 9/2012 |
| WO | WO 2013/009560 A1 | 1/2013 |
| WO | WO 2013/062413 A1 | 5/2013 |
| WO | WO 2013/089895 A1 | 6/2013 |
| WO | WO 2014/049119 A1 | 4/2014 |
| WO | WO 2014/072474 A1 | 5/2014 |
| WO | WO 2014/074559 A1 | 5/2014 |
| WO | WO 2014/077531 A1 | 5/2014 |
| WO | WO 2014/107707 A2 | 7/2014 |
| WO | WO 2014/160948 A1 | 10/2014 |
| WO | WO 2014/176022 A1 | 10/2014 |
| WO | WO 2015/034565 A1 | 3/2015 |
| WO | WO 2015/084729 A1 | 6/2015 |
| WO | WO 2015/160609 A1 | 10/2015 |

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; "Development of Interconnect Materials for Solid Oxide Fuel Cells"; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2 , Energy Convers. Mgmt., vol. 38, Supplement (1997) pp. S123- S127.

Ciacchi et al., "Tubular zirconia-yttria electrolyte membrane technology for oxygen separation", Solid State Ionics 152-153, 2002, pp. 763-768.

M. Solvang et al., "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf (retrieved on Mar. 8, 2017).

(56) References Cited

OTHER PUBLICATIONS

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

Yulia Hilli, et al.; "Sulfur adsorption and release properties of bimetallic Pd—Ni supported catalysts"; Journal of Molecular Catalysis A: Chemical, vol. 48, Jul. 28, 2015, pp. 161-171, XP029261263.

Magali Ferrandon, et al.; "Bimetallic Ni—Rh catalysts with low amounts of Rh for the steam and autothermal reforming of η-butane for fuel cell applications"; Applied Catalysis A: General, Elsevier, Amsterdam, NL, vol. 379, No. 1-2, May 15, 2010, pp. 121-128, XP027013168.

M. Boaro, et al.; "Comparison between Ni—Rh/gadolinia doped ceria catalysts in reforming of propane for anode implementations in intermediate solid oxide fuel cells"; Journal of Power Sources, Elsevier SA, CH, vol. 195, No. 2, Jan. 15, 2010, pp. 649-661, XP026640152.

Fig 6

| | OTM Combined Reformer | | |
| --- | --- | --- | --- |
| | Baseline Radiantly-Coupled Primary Reformer | Reference Fig 2. Gas-Heated Primary Reformer | Difference |
| Mixed feed, 3 | | | |
| F | 1,002 | 1,002 | |
| MMSCFD | 6.58 | 6.27 | -5% |
| lbmole/hr | 723 | 688 | |
| Air | | | |
| F | 1,699 | 1,697 | |
| MMSCFD | 9.78 | 7.37 | -25% |
| lbmole/hr | 1,074 | 809 | |
| Primary reformer outlet, 7 | | | |
| F | 1,501 | 1,200 | -20% |
| MMSCFD | 9.36 | 7 | -23% |
| lbmole/hr | 1,027 | 794 | |
| Methane Conversion % | 58.11 | 21 | -63% |
| Total Heat Duty MMBTU/hr | 18.79 | 6.24 | -67% |
| OTM outlet, 9 | | | |
| F | 1,777 | 1,777 | |
| MMSCFD | 11.29 | 11 | -5% |
| lbmole/hr | 1,240 | 1,176 | |
| Methane reformed % | 96.6 | 97.3 | 0.7% |
| Oxygen Transport, mTPD | 57.0 | 43.0 | -24.6% |
| Syngas Output, 4 | | | |
| F | 1,763 | 1,134 | -35.7% |
| Module: (H2-CO2)/(CO+CO2) | 1.88 | 2.10 | 11.7% |
| Syngas Cooling | | | |
| Steam production (lb/hr) | 12,756 | 4,063 | -68.1% |

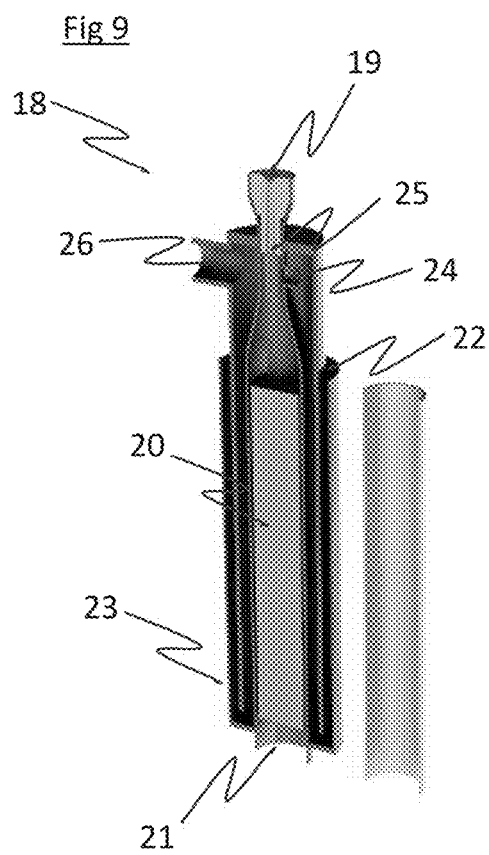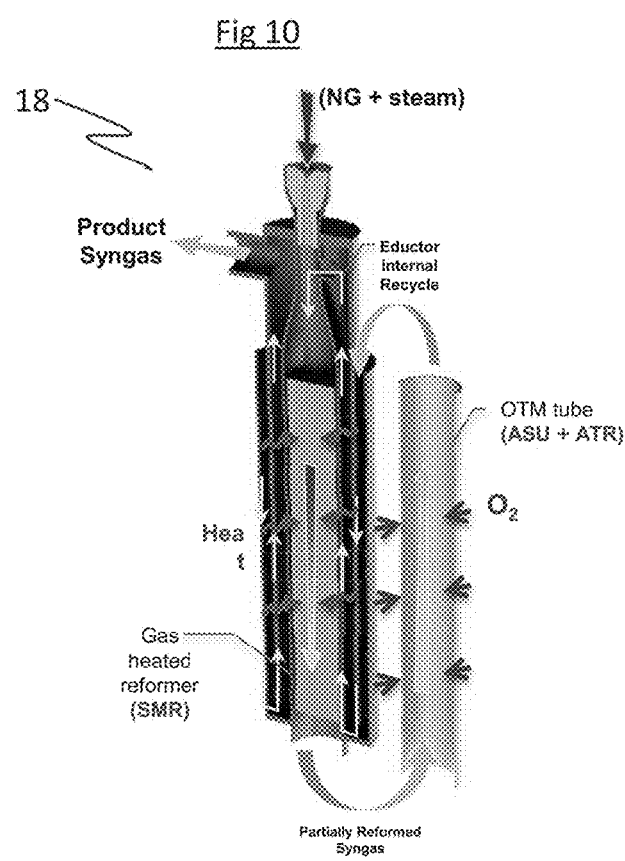

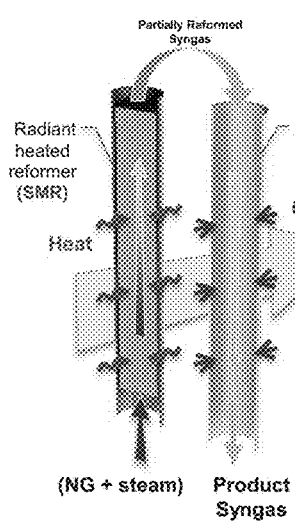
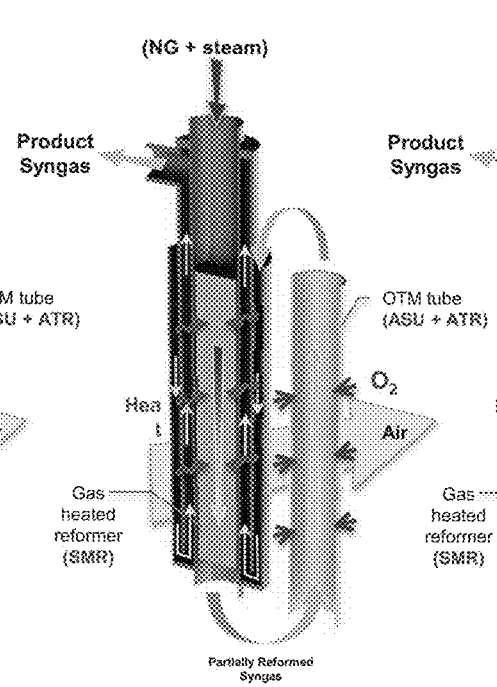
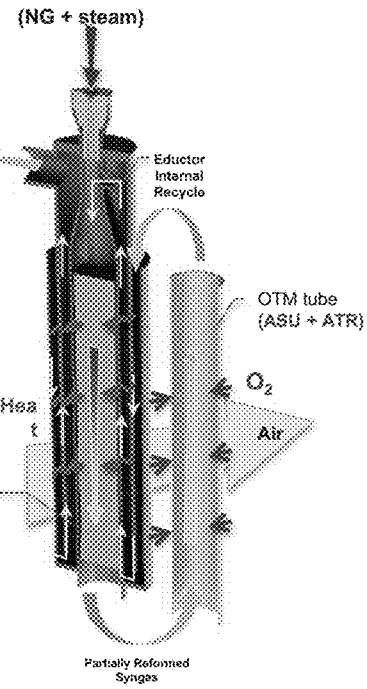
Fig 11 A
Fig 11 B
Fig 11 C

OTM SYNGAS PANEL WITH GAS HEATED REFORMER

RELATED APPLICATIONS

This application claims the benefit of International Application No. PCT/US2019/032416, filed on May 15, 2019, which claimed the benefit of U.S. Provisional Application Ser. No. 62/674,129, filed on May 21, 2018, which are incorporated herein by reference.

FIELD OF THE INVENTION

The invention generally relates to an oxygen transport membrane syngas panel whereby the reformer layer of the panel is eliminated, and the primary reforming function is integrated into the manifold as a gas heated reformer with product syngas as the source of heat.

BACKGROUND OF THE INVENTION

An oxygen transport membrane ("OTM") syngas panel executes a combined reformer function with the first primary reforming step executed in a dedicated panel layer comprised of an array or metal tubes with catalyst-coated substrates inside. This primary reformer array is juxtaposed with the OTM tube array so that the majority of heat for the reforming is provided by radiation from the surface of the OTM tubes. The partially reformed fuel and steam leaving the primary reformer layer then proceeds to the OTM tube array layer for further reaction in the presence of a secondary reforming catalyst, and heat liberated from reactions with pure oxygen supplied from the OTM. This OTM layer executes a secondary and final reforming function. This arrangement works well and has been proven, but it results in higher than desired capital cost due to the high number of tubes and catalyst inserts in the primary reforming layer. In addition, the space taken up by the primary reformer layer in the panel reduces the overall packing density of ceramic in a reactor. Lastly, the temperature of the syngas leaving the OTM tubes is very hot (approaching 1800 F) and must be conveyed to a process gas boiler for cooling. This results in relatively high net steam production as well as costly materials for the conveyance of the hot syngas to the boiler.

The technical solution provided by the present invention eliminates the radiantly-coupled primary reformer layer from the OTM combined reformer panel completely. In the new configuration, the primary reforming function is performed by a gas-heated reformer integrated into the mixed feed supply manifold and heated by the hot product syngas leaving the OTM tube layer. The primary reforming function does not need to be of high quality or high conversion. It is used only to provide some hydrogen and CO into the feed to the OTM so as to improve the oxygen flux of the OTM layer. As such, less conversion is acceptable in the primary reformer layer and so convective heating and less overall catalyst/tube surface area is allowable in practice. By integrating this function into the manifold savings on the metal and catalyst material otherwise employed in the radiantly-coupled primary reformer layer are realized along with space savings in the primary reformer layer which can be used instead for an additional OTM secondary reformer layer if desired. This reduces material cost and decreases volume required in the reactor per unit of OTM ceramic area employed.

DESCRIPTION OF THE FIGURES

FIG. 6 shows typical process results for the gas-heated primary reformer configuration of the OTM combined reformer system versus the baseline case of a radiantly-coupled OTM combined reformer system.

FIG. 9 shows an alternative embodiment whereby an internal product syngas recycle is produced with an eductor assembly installed at the junction of feed gas stream and product gas stream manifolds.

FIG. 10 is a schematic illustration of the embodiment of FIG. 9 in context of the function of the gas heated reformer and ceramic membrane.

FIG. 11 A is a schematic of a prior-art disclosed configuration of an OTM combined reformer where the first stage reforming step is radiantly-heated FIG. 11 B is a schematic depicting the function of one embodiment of the current invention where the first stage reforming step is gas-heated, and the source of heat is the sensible heat of the hydrogen-containing synthesis gas produced by the reactions within the ceramic membranes.

FIG. 11 C is a schematic depicting the function of one embodiment of the current invention where the first stage reforming step is gas-heated, and the source of heat is the sensible heat of the hydrogen-containing synthesis gas produced by the reactions within the ceramic membranes. A portion of the hydrogen-containing synthesis gas is subsequently recycled to the hydrocarbon-containing feed stream through action of a gas eductor.

SUMMARY OF THE INVENTION

The present invention generally relates to an oxygen transport membrane syngas panel whereby the reformer layer of the panel is eliminated, and the primary reforming function is integrated into the manifold as a gas heated reformer with product syngas as the source of heat.

DETAILED DESCRIPTION OF THE INVENTION

As described herein, the present invention provides an oxygen transport membrane syngas panel where primary reforming function is integrated into the manifold as a gas heated reformer with product syngas as the source of heat.

The invention eliminates the radiantly-coupled primary reformer layer from the OTM combined reformer panel completely. In this new configuration, the primary reforming function is performed by a gas-heated reformer integrated into the mixed feed supply manifold and heated by the hot product syngas leaving the OTM tube layer. The primary reforming function does not need to be of high quality or high conversion. It is used only to provide some hydrogen and CO into the feed to the OTM so as to improve the oxygen flux of the OTM layer. As such, less conversion is acceptable in the primary reformer layer and so convective heating and less overall catalyst/tube surface area is allowable in practice. Considerable savings are realized by integrating this function into the manifold as metal and catalyst material otherwise employed in the radiantly-coupled primary reformer layer can be eliminated. There is also a savings in space through elimination of the primary reformer layer which can be used instead for an additional OTM secondary reformer layer if desired. This reduces material cost and decreases volume required in the reactor per unit of OTM ceramic area employed.

Figure 1:
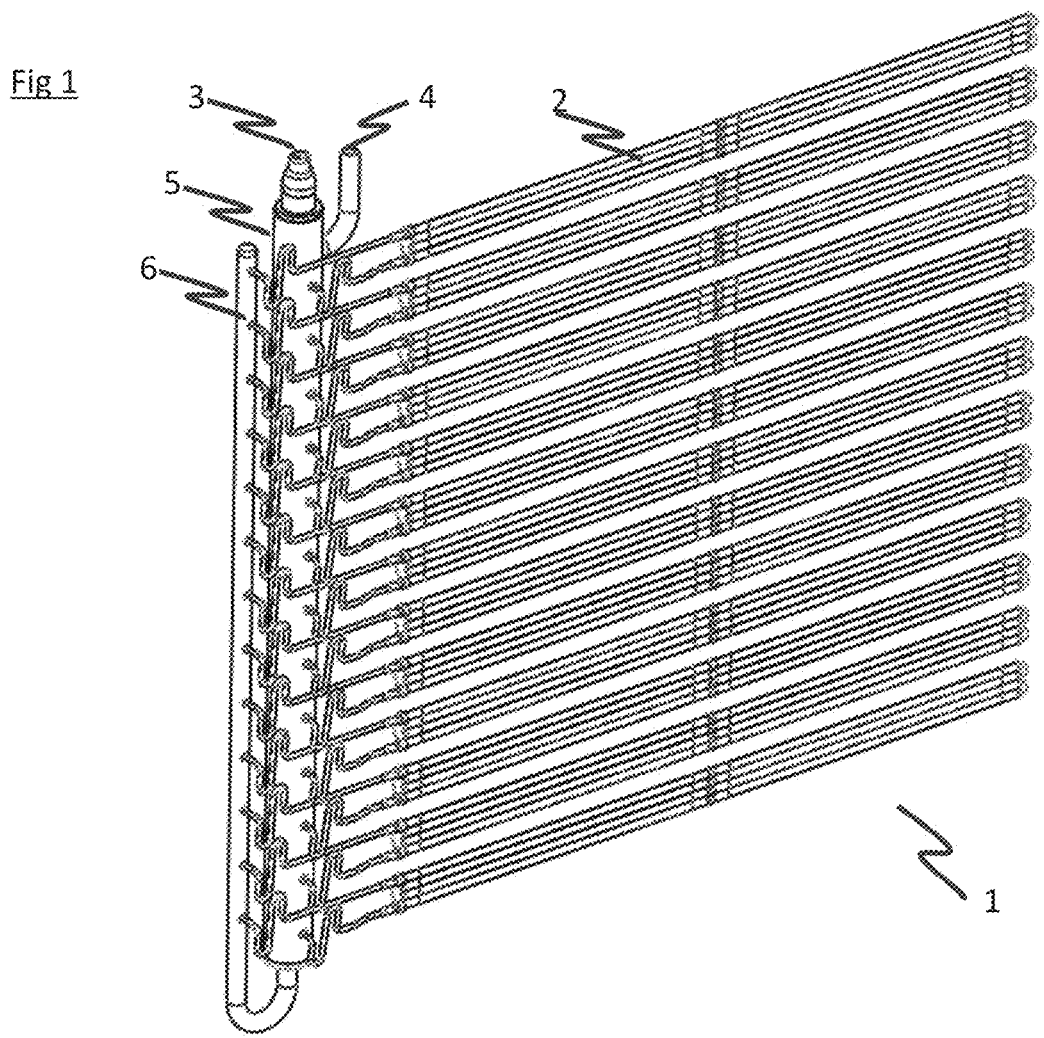
FIG. 1 shows one configuration of a syngas producing apparatus according to the invention.

In FIG. 1, the syngas producing apparatus supplied by a first gas stream, at input 3, connected to a first manifold, 6, and producing a product gas stream at output, 4, and further comprising an array of two or more ceramic oxygen transport membranes, 2, configured with retentate side on the outside of the tube array, the retentate side supplied with a heated mixture of gases containing oxygen, and with the input end of the ceramic membrane array connected to a first manifold, 6, and the output end of the ceramic membrane connected to a second manifold, 5, with the first manifold, 6, configured such that a gas stream therein may receive heat from the gas stream within the second manifold, 5.

Figure 2:
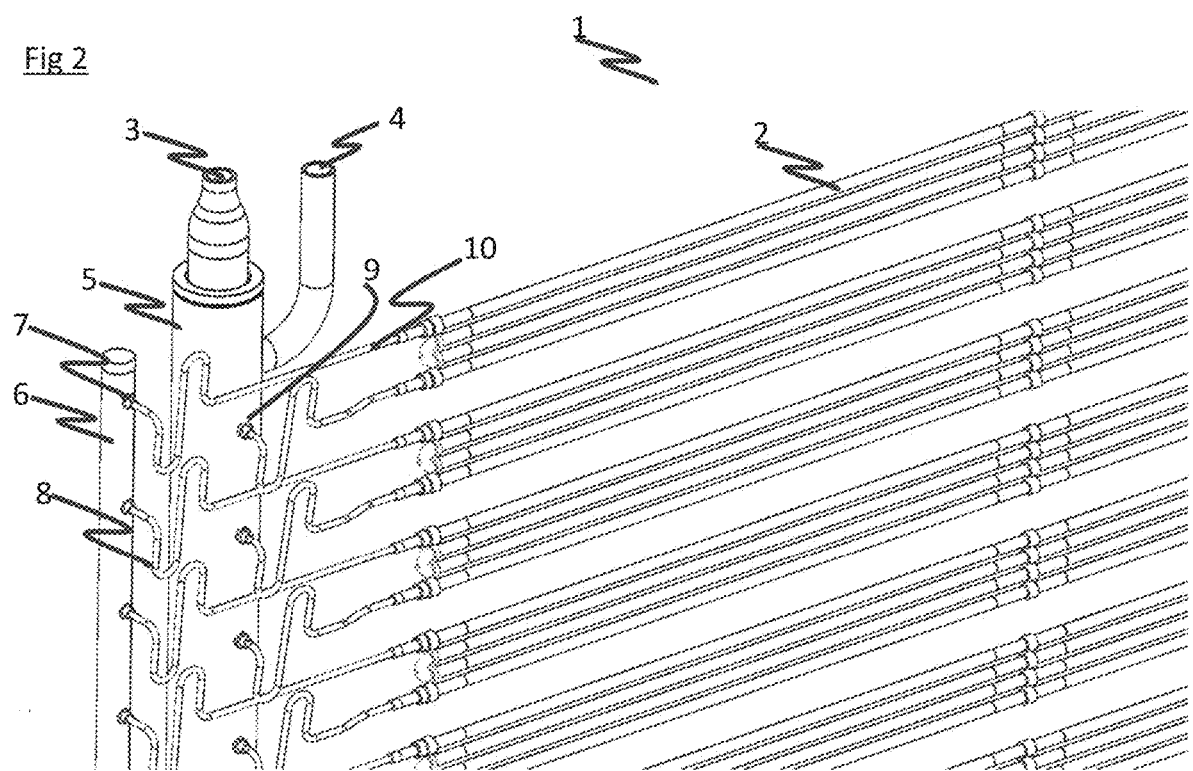
FIG. 2 shows a close-up view of the syngas producing device of the invention.

In FIG. 2, the syngas producing device 1, supplied by a first gas stream, at input 3, connected to a first manifold, 6, and producing a product gas stream at output, 4, and further comprising an array of two or more ceramic oxygen transport membranes, 2, with the input end of the ceramic membrane array connected to a first manifold, 6, through connecting tube, 8, and the output end of the ceramic membrane connected to a second manifold, 5, through connecting tube, 10, with the first manifold, 6, configured such that a gas stream therein may receive heat from the gas stream within the second manifold, 5.

Figure 3:
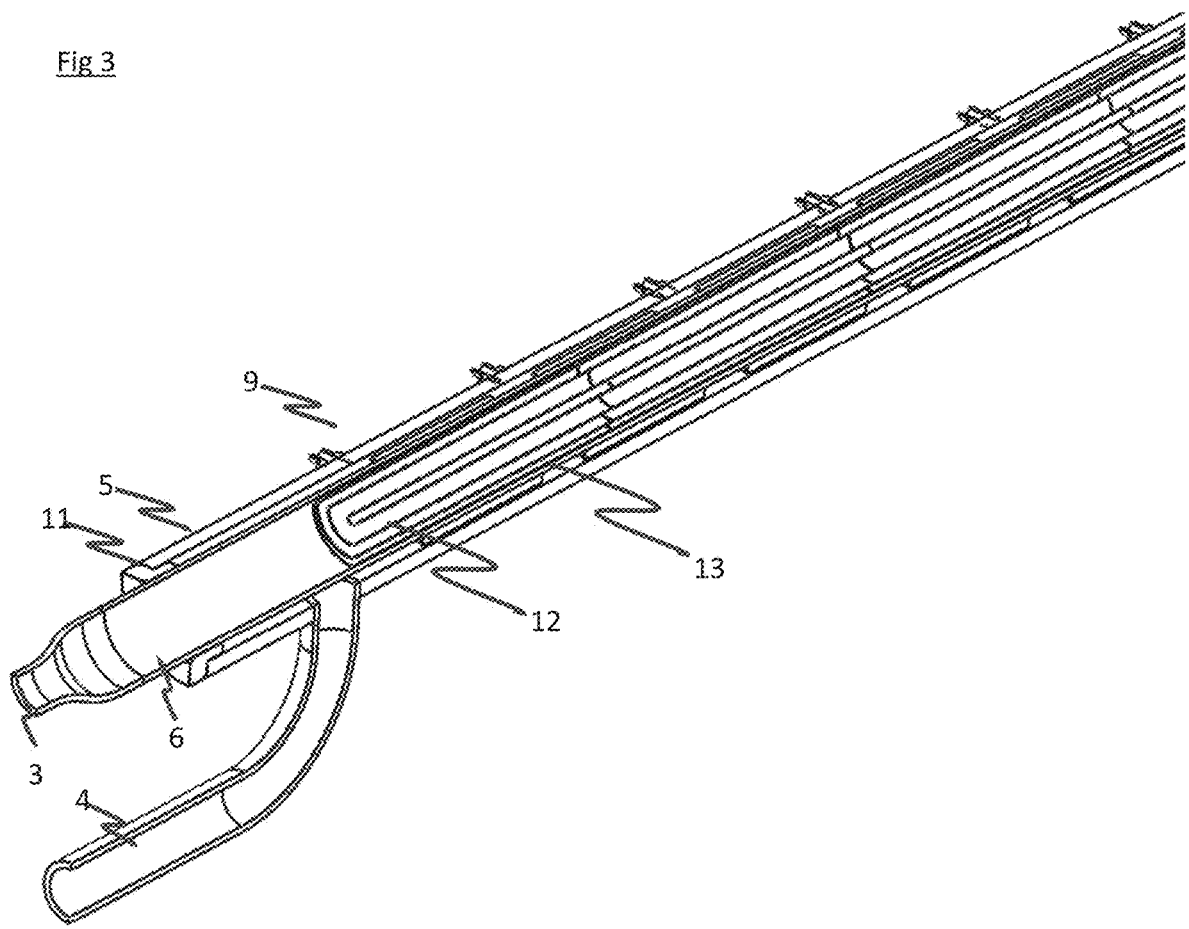
FIG. 3 shows the manifold arrangement between the first manifold, 6 and second manifold.

FIG. 3 shows a first manifold, 6, juxtaposed with a second manifold, 5, such that heat may be provided to a feed gas stream supplied at inlet, 3, with hot gas flowing through second manifold, 5, and said hot gas supplied to second manifold, 5, through a plurality of ports 9. In a typical configuration, hot gas is supplied to port connections, 9, through a plurality of ceramic membrane tube arrays, 2, through connection tubes 10 from FIG. 2. To promote increased heat transfer between the gas stream in first manifold, 6, and second manifold, 5, extended metal surfaces may be brazed or welded to the surface of first manifold, 6, in contact with the hot gas conveyed through second manifold, 5. These extended metal surfaces will typically take the form of a straight radially-oriented fin, or a laterally-oriented serrated fin-all such configurations well known to those skilled in the art of heat transfer. Optionally, a plurality of substrates, 12, may be positioned within first manifold, 6, to enhance surface area and increase conductivity at the surface for improved heat exchange with the hot gas conveyed in second manifold, 5. Further, said substrates, 12, may be coated with a catalyst-containing material to promote steam-methane-reforming reactions in the gas stream conveyed in first manifold, 6. The first manifold, 6, and the second manifold, 5 can be extended in length to accommodate a first heat exchange section and a second heat exchange section. The first heat exchange section is oriented nearest the inlet, 3, and the second heat exchange section is located down the flow stream from the inlet, 3, and the first heat exchange section. The second manifold, 5, is configured so as to provide heat exchange in first and second heat exchange sections in first manifold, 6. The first heat exchange section is introduced to allow either preheating of the gas introduced at inlet, 3, and/or reactions within one or more catalytically-coated first substrate inserted in the first heat exchange section within manifold, 6. The second heat exchange section is introduced to allow either further heating of the gas provided from the first heat exchange section, and/or reactions within one or more catalytically-coated second substrate inserted in the second heat exchange section within manifold, 6. This approach may be extended to two or more heat exchange sections to accommodate two or more gas heating and/or catalytic reaction regions within first manifold, 6.

Figure 4:
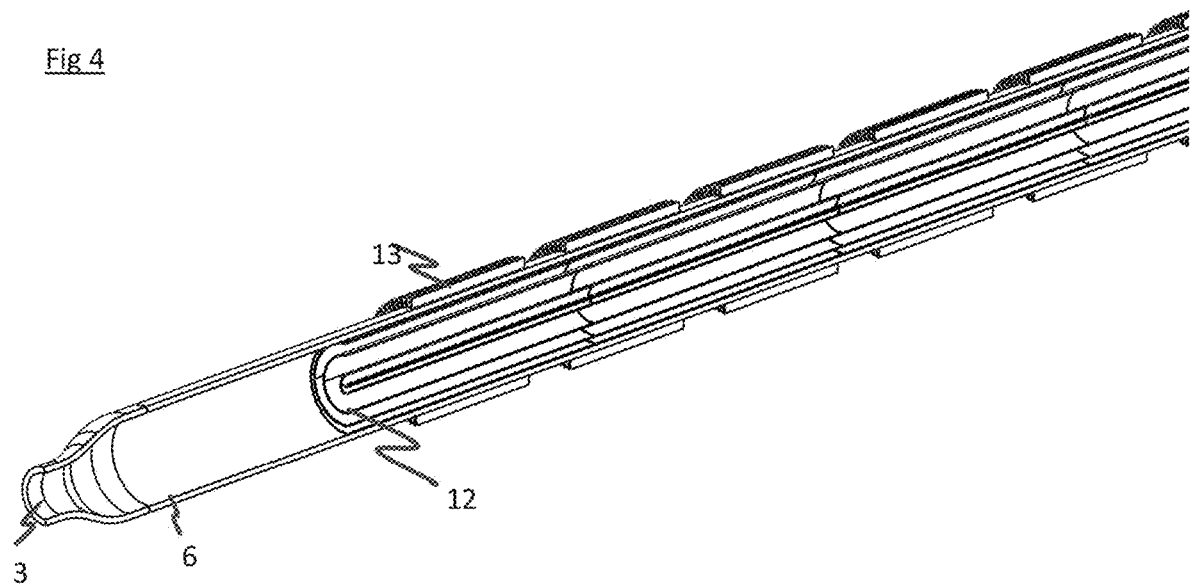
FIG. 4 describes detail of first manifold, 6, with feed input gas connection, 3, and plurality of extended surfaces, 13, and plurality of substrates, 12.
Figure 5:
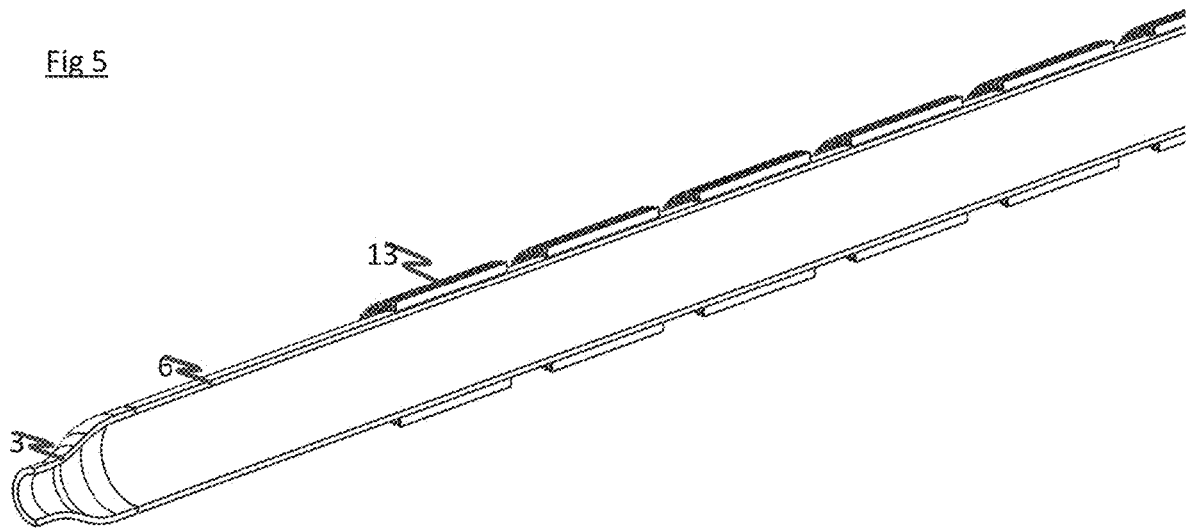
FIG. 5 describes detail of first manifold, 6, with feed input gas connection, 3, with extended surfaces, 13, but with substrates, 12, removed for clarity.

FIG. 4 describes detail of first manifold, 6, with feed input gas connection, 3, and plurality of extended surfaces, 13, and plurality of substrates, 12, while FIG. 5 describes detail of first manifold, 6, with feed input gas connection, 3, with extended surfaces, 13, but with substrates, 12, removed for clarity.

FIG. 6 shows typical process results for the gas-heated primary reformer configuration of the OTM combined reformer system versus the baseline case of a radiantly-coupled OTM combined reformer system. Referring to FIG. 2, due to the nature of the heat exchange between the gases in first manifold, 6, and second manifold, 5, the primary reformer output, 7, and the syngas output, 4, are significantly cooler than in the baseline case. This results in lower overall methane conversion in the primary reformer, but also significantly less heat required to be provided in the syngas cooling train (reduced steam production), and overall less oxygen required from the OTM membranes to provide the oxy-combustion heat to facilitate the radiantly coupled primary reformer stage. The resulting system produces less syngas on a mole basis but has a higher overall carbon conversion to CO (versus CO2) and increased hydrogen output per mole of natural gas feed. This results in an increased stoichiometric module, (H2-CO2)/(CO+CO2), from 1.88, typical of auto-thermal reformers, to 2.1, typical of large-scale oxygen-blown combined reformer systems optimized for methanol production. Ignoring improved productivity in the downstream methanol synthesis loop due to the increased stoichiometric module, the OTM combined reformer with a gas-heated primary reformer stage reduces fuel consumption by 5%, ceramic oxygen membrane oxygen, and thus surface area requirements by 20-25%, and thus required supply airflow to the OTM membranes by 25%.

Figure 7:
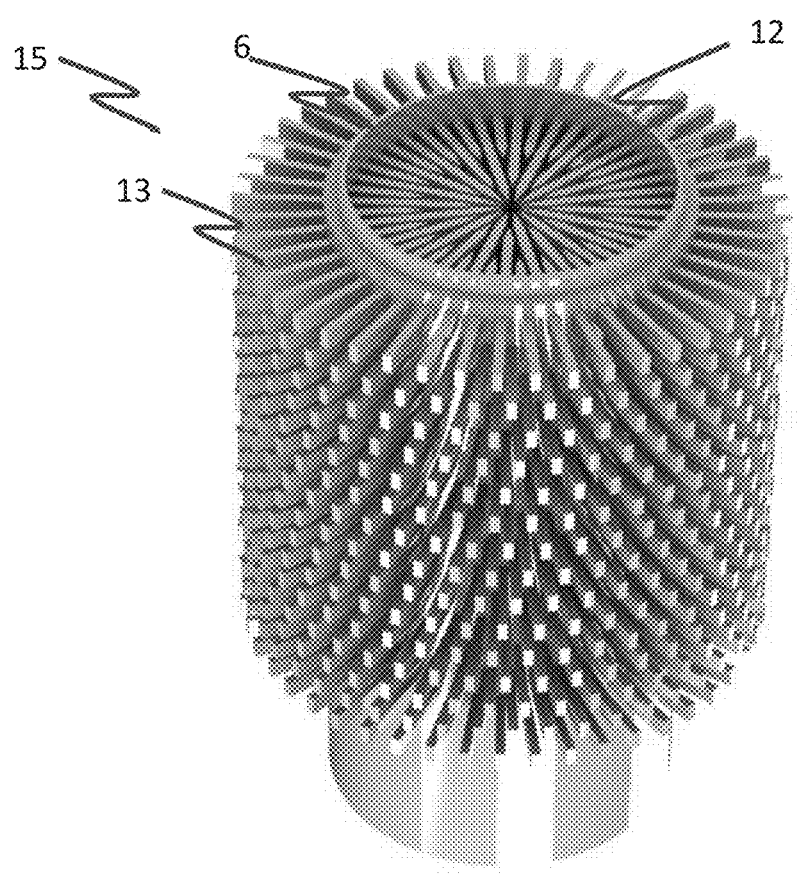
FIG. 7 shows an alternative embodiment, whereby a section of the gas-heated primary reformer, 15, is produced as an integrated unit through an additive-manufacturing process (i.e. "3D Printing"). This sub-unit is produced as an integral unit of homogenous metal material, or with graded metal (non-homogenous), and combines elements of first manifold, 6, extended surfaces, 13, and substrates, 12.

FIG. 7 shows an alternative embodiment, whereby a section of the gas-heated primary reformer, 15, is produced as an integrated unit through an additive-manufacturing process (i.e. "3D Printing"). This sub-unit is produced as an integral unit of homogenous metal material, or with graded metal (non-homogenous), and combines elements of first manifold, 6, extended surfaces, 13, and substrates, 12.

Figure 8:
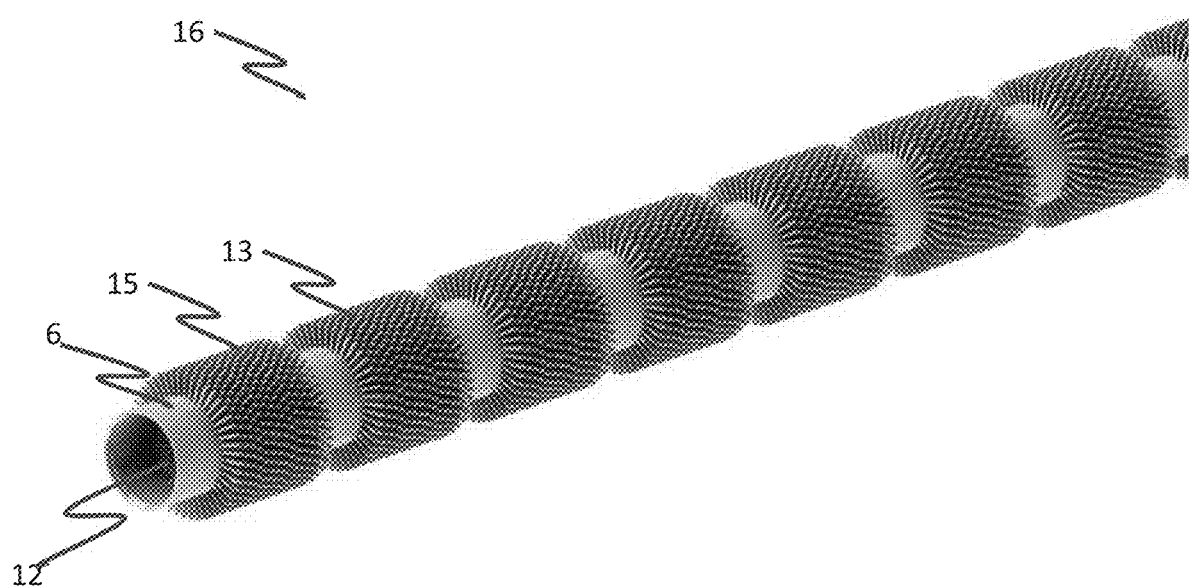
FIG. 8 shows an alternative embodiment whereby a larger section of the gas-heated primary reformer, 16, is produced by concatenating and joining multiple sub-units, 15, said sub-units produced with an additive-manufacturing process, and when combined, creating an integrated structure combining required elements of first manifold, 6, extended surfaces, 13, and substrates, 12.

FIG. 8 shows an alternative embodiment whereby a larger section of the gas-heated primary reformer, 16, is produced by concatenating and joining multiple sub-units, 15, said sub-units produced with an additive-manufacturing process, and when combined, creating an integrated structure combining required elements of first manifold, 6, extended surfaces, 13, and substrates, 12. The required function of these elements may be achieved by a single additively manufactured unit, or two or more additively manufactured sub-unit, concatenated, and joined together.

FIG. 9 shows an alternative embodiment for the syngas-heated reformer, 18, providing an internal product syngas recycle stream, 24, diverted from product gas stream, 26, which is produced by eductor assembly 25, driven by mixed feed inlet flow 19. The mixed stream comprising mixed feed stream 19, and internal recycle stream 24, is heated and reacted in reformer section 20, heated by syngas product stream entering assembly at 22 and conveyed through heat exchanger portion 23. Alternatively, reformer section 20, heated by heat exchanger 23, may be used for mixed gas preheating only if catalyst is not used in section 20.

FIG. 10 is a schematic illustration of the embodiment of FIG. 9 in context of the function of the gas heated reformer and ceramic membrane.

FIG. 11 A is a schematic of a prior-art disclosed configuration of an OTM combined reformer where a hydrocarbon-containing feed stream is reacted in a first radiantly-heated primary reformer stage and subsequently a second stage utilizing a ceramic membrane-based secondary reformer with heat and oxygen provided by said ceramic membrane, thus producing a hydrogen-containing synthesis gas stream.

FIG. 11 B is a schematic depicting the function of one embodiment of the current invention where a hydrocarbon-containing feed stream is reacted in a first gas-heated primary reformer stage and subsequently a second stage utilizing a ceramic membrane-based secondary reformer with heat and oxygen provided by said ceramic membrane to produce a hydrogen containing synthesis gas stream. A portion of the sensible heat contained in the synthesis gas stream is used in a heat exchanger configuration to provide heat for the gas-heated reformer, a portion of which is integrated with said heat exchanger, thus producing a cooled hydrogen-containing synthesis gas stream.

FIG. 11 C is a schematic depicting the function of one embodiment of the current invention where a hydrocarbon and hydrogen-containing feed stream is reacted in a first gas-heated primary reformer stage and subsequently a second stage utilizing a ceramic membrane-based secondary reformer with heat and oxygen provided by said ceramic membrane to produce a hydrogen containing synthesis gas stream. A portion of the sensible heat contained in the synthesis gas stream is used in a heat exchanger configuration to provide heat for the gas-heated reformer, a portion of which is integrated with said heat exchanger, thus producing a cooled hydrogen-containing synthesis gas stream. A portion of the cooled hydrogen-containing synthesis gas stream is recycled to the hydrocarbon-containing feed stream through action of a gas eductor installed proximate to and connected to the feed stream and the cooled hydrogen-containing synthesis gas stream.

With syngas cooled in the second manifold to approximately 1100 F, a risk of "metal dusting" or inter-grain boundary carbide formation and subsequent material pitting is present and well-known by practitioners of syngas production. Generally, the rates of metal dusting can be significantly reduced with care of metal alloy selection and/or appropriate coatings and/or heat treatments. Nickel-based super alloys with high Ni and Cr content, and in some cases Cu content have increased resistance to metal dusting. Inconel 617 and 693, and Haynes HR-224 & HR-233, have increased metal dusting resistance over many other Ni-based superalloys for high temperature service. For alloys with greater than 2% aluminum by weight, heat treatment in a hydrogen partial pressure atmosphere can precipitate an alumina scale on the surface of the metal and improve metal dusting resistance. Lastly, Praxair Surface Technology (PST) has SermAlcote™ coatings which provide a barrier layer of alumina which has been shown to further provide resistance to metal dusting.

When syngas is cooled to approximately 500° F. to 850° F., there is increased risk of solid carbon formation via the Boudouard reaction: $2CO \rightarrow C(s)+CO_2$. This reaction generally occurs at a surface in content with gas containing CO and can lead to excessive carbon build up and fouling. Surface characteristics play a role in the rate of carbon formation vs. reverse reactions with steam and $CO_2$ that will gasify solid carbon. Coatings of some metal oxides such as CeO and BaO on the surface of the metal may help increase the rates of carbon gasification at the surface, due to the interaction of oxygen and steam at the coated surface, and thus mitigate risk of carbon formation where the Boudouard reaction has high activity.

We claim:

1. An oxygen transport membrane based reforming system for producing synthesis gas which comprises;
    a reactor housing;
    a reactively driven oxygen transport membrane reactor within said housing, said reactor comprising a plurality of oxygen transport membrane elements configured to separate oxygen from an oxygen containing feed stream and produce an oxygen permeate at a permeate side of the oxygen transport membrane elements, wherein the input end of said oxygen transport membrane reactor is connected to a first manifold and the output of said oxygen transport membrane reactor is connected to a second manifold;
    a reforming catalyst containing gas heated reformer integrated within said first manifold, said first manifold being thermally coupled with said second manifold,
    wherein a hydrocarbon containing feed stream is partially reformed in said first manifold generating a hydrogen-containing, partially reformed feed stream which is fed to the input end of said oxygen transport membrane reactor in contact with the permeate side of the plurality of oxygen transport membrane elements and reacts with oxygen permeate to reactively drive the separation of oxygen from the oxygen containing feed stream and to generate a reaction product stream and heat entering said second manifold, wherein the first manifold is configured such that said second manifold supplies the heat needed for endothermic reforming taking place in said first manifold.

2. The apparatus of claim 1 where the oxygen transport membrane comprises a dense, mixed electronic/ionic conducting ceramic membrane between a porous ceramic mixed electronic/ionic conducting electrode layer attached to the dense membrane on the retentate side, and a porous ceramic mixed electronic/ionic conducting electrode layer attached to the dense membrane on the permeate side, and a porous ceramic support structure attached to the electrode layer on the permeate side, or the retentate side.

3. The apparatus of claim 2 where the gas stream at the retentate side of the membrane comprises nitrogen and oxygen, and gas stream at the permeate side of the membrane is a hydrogen-containing gas stream.

4. The apparatus of claim 2 where the gas stream at the retentate side of the membrane comprises steam and/or hydrogen, and gas stream at the permeate side of the membrane is a hydrogen-containing gas stream.

5. The apparatus of claim 2 where the gas stream at the retentate side of the membrane comprises carbon-dioxide and/or carbon monoxide, and the gas stream at the permeate side of the membrane is a hydrogen-containing gas stream.

6. The apparatus of claim 2 where a porous ceramic layer is attached to the porous support as an outermost layer on the permeate side of the membrane, wherein said layer further comprises a reforming catalyst comprising nickel and or rhodium.

7. The apparatus of claim 6 where a portion of the first manifold comprises a metal substrate comprising nickel and/or rhodium containing catalyst such that the gas feed stream entering the first manifold is reacted in a steam-methane-reforming reaction in the presence of heat provided by heat exchange with the reaction product stream and heat from within the second manifold.

8. The apparatus of claim 7 where a first manifold, and a second manifold, are extended in length to accommodate a first heat exchange section and a second heat exchange section where said first heat exchange section is oriented nearest the first manifold inlet, and the second heat exchange section is located down the flow stream from said first heat exchange section, and the second manifold is configured so as to provide heat exchange in first and second heat exchange sections in first manifold; where the first heat exchange is for preheating of the gas introduced at the first manifold inlet and/or reactions within one or more catalytically-coated first substrate inserted in the first heat exchange section within first manifold; the second heat exchange section allows either further heating of the gas provided from the first heat exchange section, and/or reactions within one or more catalytically-coated second substrate inserted in the second heat exchange section within first manifold.

9. The apparatus of claim 8 extended to two or more heat exchange sections to accommodate two or more gas heating and/or catalytic reaction regions within first manifold.

10. A method for producing a synthesis gas in an oxygen transport membrane based reforming system, said system comprising a reactively driven oxygen transport membrane reactor said reactor comprising a plurality of oxygen transport membrane elements configured to separate oxygen from an oxygen containing feed stream and produce an oxygen permeate at a permeate side of the oxygen transport membrane elements, wherein the input end of said oxygen transport membrane reactor is connected to a first manifold and the output of said oxygen transport membrane reactor is connected to a second manifold;

wherein said first manifold comprises a reforming catalyst containing gas heated reformer integrated therein, said first manifold being thermally coupled with said second manifold, the method comprising the steps of:

feeding the hydrocarbon containing feed stream to the inlet of the gas heated reforming reactor in the presence of a reforming catalyst disposed therein and heat to produce a partially reformed synthesis gas stream containing hydrogen at the outlet of said gas heated reformer;

feeding the partially reformed synthesis gas stream exiting said gas heated reformer to a reactant side of a reactively driven and catalyst containing oxygen transport membrane reactor, wherein the oxygen transport membrane reactor includes at least one oxygen transport membrane element configured to separate oxygen from an oxygen containing stream at the oxidant side of the reactively driven and catalyst containing oxygen transport membrane reactor to the reactant side through oxygen ion transport when subjected to an elevated operational temperature and a difference in oxygen partial pressure across the at least one oxygen transport membrane element;

reacting a portion of the reformed synthesis gas stream with oxygen permeated through the at least one oxygen transport membrane element to produce the difference in oxygen partial pressure across the at least one oxygen transport membrane element and generate reaction products and heat, including a first portion of the heat required for the reforming of the hydrocarbon containing feed stream; and reforming a portion of the unreformed hydrocarbon gas in the partially reformed synthesis gas stream in the presence of one or more catalysts contained in the oxygen transport membrane reactor, the reaction products and the heat to produce a synthesis gas product stream which enters said second manifold;

wherein the heat required for the reforming in the gas heated reformer in said first manifold is transferred from the second manifold proximate to said first manifold.

11. The method of claim 10 wherein the heat generated as a result of the reaction of the reformed synthesis gas stream with permeated oxygen is transferred: (i) to the reformed synthesis gas stream present in the catalyst containing oxygen transport membrane reactor; and (ii) to the gas heated reforming reactor integrated within the first manifold.

12. The method of claim 10 which additionally comprises an auxiliary heat source that provides between about 15% and 85% of the heat required for the reforming of the hydrocarbon containing feed stream in the gas heated reforming reactor integrated within said first manifold.

13. The method of claim 12 wherein the auxiliary heat source is one or more reactively driven, oxygen transport membrane reactors.

14. The method of claim 10 wherein the reactively driven oxygen transport membrane reactor comprises a plurality of oxygen transport membrane elements disposed proximate the reforming reactor and configured to: (i) separate and transport oxygen from the oxygen containing stream contacting the oxidant side of the oxygen transport membrane element to the reactant side of the oxygen transport membrane element through oxygen ion transport; (ii) receive a hydrogen containing stream at the reactant side; and (iii) react the hydrogen containing stream with the permeated oxygen at the reactant side to produce the difference in oxygen partial pressure across the oxygen transport membrane element and to produce an auxiliary reaction product stream and heat.

15. The method of claim 10 wherein a portion of the partially reformed synthesis gas stream exiting the gas heated reformer is recycled and mixed with the hydrocarbon containing feed stream by action of an eductor assembly proximate to the outlet from the gas heated reformer.

16. The method of claim 15 wherein said educator assembly is proximate to the inlet of said gas heated reformer.

* * * * *